United States Patent
Roux et al.

(10) Patent No.: US 10,402,596 B2
(45) Date of Patent: Sep. 3, 2019

(54) SECURITY ELEMENT FOR DATA INPUT DEVICE AND METHOD THE SAME

(71) Applicant: INGENICO GROUP, Paris (FR)

(72) Inventors: Julien Roux, Caluire (FR); Sylvain Barneron, Bourg-les-Valence (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/573,716

(22) PCT Filed: May 9, 2016

(86) PCT No.: PCT/EP2016/060319
§ 371 (c)(1),
(2) Date: Nov. 13, 2017

(87) PCT Pub. No.: WO2016/180772
PCT Pub. Date: Nov. 17, 2016

(65) Prior Publication Data
US 2018/0068135 A1    Mar. 8, 2018

(30) Foreign Application Priority Data
May 11, 2015    (FR) ...................................... 15 54198

(51) Int. Cl.
*G06F 21/86* (2013.01)
*G06F 21/83* (2013.01)
(Continued)

(52) U.S. Cl.
CPC .............. *G06F 21/86* (2013.01); *G06F 21/83* (2013.01); *H01H 3/16* (2013.01); *H05K 5/0208* (2013.01);
(Continued)

(58) Field of Classification Search
CPC ...... H05K 1/0298; H05K 1/021; H05K 3/022; H05K 3/284; G06F 21/83; G06F 21/86
(Continued)

(56) References Cited

U.S. PATENT DOCUMENTS 5,473,344 A * 12/1995 Bacon ................... G06F 3/0312
                                                    345/157
6,016,423 A *  1/2000 Ross ........................ H01Q 1/22
                                                    455/90.3
(Continued)

FOREIGN PATENT DOCUMENTS

EP    1432031 A1    6/2004
FR    2815733 A1    4/2002

OTHER PUBLICATIONS

International Search Report dated Jul. 7, 2016 for corresponding International Application No. PCT/EP2016/060319, filed May 9, 2016.
(Continued)

*Primary Examiner* — Tuan T Dinh
(74) *Attorney, Agent, or Firm* — David D. Brush; Westman, Champlin & Koehler, P.A.

(57) ABSTRACT

A security element for a data input device and a method for detecting intrusion in the data input device. The security element has a shape suited to closing contacts via each of two extremities respectively on first and second printed-circuit boards of the data input device when the data input device is in the closed position. The extremities are not electrically connected to each other.

6 Claims, 2 Drawing Sheets

(51) Int. Cl.
*H01H 3/16* (2006.01)
*H05K 5/02* (2006.01)

(52) U.S. Cl.
CPC . *H01H 2231/006* (2013.01); *H01H 2239/032* (2013.01)

(58) Field of Classification Search
USPC .................... 361/760–764, 782–784, 803
See application file for complete search history.

(56) References Cited

U.S. PATENT DOCUMENTS

| | | | | |
|---|---|---|---|---|
| 2002/0118167 | A1* | 8/2002 | Mei | G06F 1/1616 345/163 |
| 2004/0208633 | A1* | 10/2004 | Akashi | H04B 10/503 398/182 |
| 2007/0062791 | A1 | 3/2007 | Quinque et al. | |
| 2007/0065215 | A1* | 3/2007 | Brown | G06F 3/0238 400/490 |
| 2011/0048756 | A1 | 3/2011 | Shi et al. | |

OTHER PUBLICATIONS

English translation of the Written Opinion of the International Searching Authority dated Jul. 14, 2016 for corresponding International Application No. PCT/EP2016/060319, filed May 9, 2016.

\* cited by examiner

SECURITY ELEMENT FOR DATA INPUT DEVICE AND METHOD THE SAME

CROSS-REFERENCE TO RELATED APPLICATIONS

This Application is a Section 371 National Stage Application of International Application No. PCT/EP2016/060319, filed May 9, 2016, which is incorporated by reference in its entirety and published as WO 2016/180772 A1 on Nov. 17, 2016, not in English.

1. FIELD OF THE INVENTION

The invention relates to the field of data entry or input devices such as payment terminals. The invention relates more particularly to the securing of such data input or input devices, for example by detection of opening or intrusion.

2. PRIOR ART

Since payment terminals process sensitive data, they need to be protected against attempts at fraud. Thus, there are hardware and/or software protection measures.

Hardware protective measures include especially techniques to detect the opening of the cover of the electronic payment terminal, for example by the use of elastomer <<dummy keys>> associated with <<carbon pads>> or <<metal domes>> that make it possible to verify that the terminal has not been subjected to any attempt at dismantling.

Indeed, a payment terminal conventionally has an upper half-shell and a lower half-shell. The upper half-shell has apertures that are used, for example, to let the keys of the keypad and the display screen of the terminal to pass through. On the keypad, the dummy-key devices are used to verify, on the one hand, that the upper half-shell of the terminal is properly fitted into the lower half-shell and, on the other hand, that the dummy keys rest on at least one printed-circuit board (motherboard) present in the payment terminal. This ensures that the payment terminal is not open and therefore that there is no attempt to insert a spy device into the keypad of the payment terminal for example. The dummy keys are pressed for example by means of a plastic extension (which may or may not be unperforated) extending from the interior of the upper half-shell in such a way as to take position on the dummy key of this printed-circuit board (the motherboard). This prior art solution is generally fairly efficient. However, this solution is quite old and not necessarily suited to novel types of payment terminals.

Indeed, it is difficult to create such dummy keys when the keys of the keypad are arranged compactly and close to each other. Indeed, the prior-art solution requires relatively large spaces between the keys so that the plastic extensions extending from the interior of the upper half-shell can pass through the keypad and take position on the dummy key of the motherboard. Now, the goal of reducing the size of the payment terminals means that the space for such plastic extensions will not necessarily be available.

Another drawback relates to the manufacturing of the plastic extension itself and, from a more general viewpoint, to the manufacturing of the upper half-shell. This manufacturing raises problems in terms of both aesthetics and security. From the aesthetic viewpoint, on the visible, external face of the upper half-shell, the presence of extensions causes a slight, hollow deformation at the place where this extension is situated. This is because the lower and upper half-shells, like the majority of the other plastic parts needed to manufacture the terminal, are manufactured by means of a method of injection in which hot plastic material is introduced under pressure into a mold. The injection of plastic causes deformations at certain positions in the parts, for example in the extensions. The problem of security stems from this aesthetic problem. The fact is that an attacker knows precisely where the dummy keys are situated by observing the keypad: the deformations that are present between the keys, at the positions where the plastic extensions extend towards the dummy keys disposed on the motherboard of the terminal, make it easy to identify the location of these dummy keys and therefore to inform the attacker about the places where these dummy keys are not situated. The attacker can then try to pierce the upper half-shell to insert a spy device therein.

Finally, it is easy for an attacker to glue the dummy key as well as the plastic that holds it and then cut out the cover on which it rests. An attacker can then obtain an easy-to-handle sub-assembly consisting of the printed-circuit board (PCB) and the dummy key as well a piece of associated cover. The protection is therefore relatively easy to circumvent, even if it causes a loss of time for the attacker and increases his risks of being caught.

3. SUMMARY

The invention proposes a novel solution that does not have all these drawbacks of the prior art, in the form of a security element for a data input device, the security element having a shape suited to closing contacts via each of its two extremities on two respective printed-circuit boards of the data input device when the data input device is in the closed position, the extremities being not electrically connected to each other.

Thus, the invention proposes a novel and inventive solution to the securing of a data input device enabling the creation of a security zone within the device, between two printed-circuit boards, by means of a single security element.

To this end, the invention provides for the implementing of a sort of "dual-face dummy key" that rests, through each of its extremities, on two printed-circuit boards, the two extremities of the dummy key being not electronically connected to each other. Thus, the two printed-circuit boards secure each other mutually via this security element because if it is removed or damaged, an intrusion/infringement is detected on either of the printed-circuit boards.

Indeed, when the data input device is in a closed position, each of the two extremities of the security element respectively closes one or more contacts on each of the two printed-circuit boards so as to make it possible to detect an opening of these contacts as soon as the data input device is opened. In this case, the security element is no longer in contact with one of the printed-circuit boards or both printed-circuit boards and this break of contact is detected by the detection circuits planned for this purpose on each of the two printed-circuit boards.

It must be noted that the two extremities of the security element are not electronically connected to each other and therefore do not enable the electrical connection of the two printed-circuit boards with each other. The aim sought indeed is not to detect a break of connection between two printed-circuit boards connected to each other via an element such as a Zebra connector but actually to detect the opening of the data input device through a security element constituting "dual-face dummy key".

For example, the adapted shape corresponds to a cylinder that is crenelated or ridged on at least a part of the height of its external surface.

Thus, according to this embodiment of the invention, the security element has a crenelated cylinder shape or toothed wheel shape especially suited to limiting respective pressures on the two printed-circuit boards.

According to one particular aspect of the invention, the security element has a cylindrical protrusion at each extremity, the protrusions being intended to provide contacts with each of the printed-circuit boards.

Thus, according to this embodiment of the invention, the security element has two protrusions, one at each extremity of the cylinder, so as to ensure contact with each of the two printed-circuit boards.

It must be noted that these protrusions can be of different sizes for example according to the space available on each of the two printed-circuit boards.

According to one particular characteristic of the invention, the security element furthermore has a positioning fin that extends laterally on a part of its height intended to provide for the positioning and holding of the security element in at least one housing provided on one of the two printed-circuit boards.

Thus, according to this embodiment of the invention, the security element also has a positioning fin extending laterally on a part of its height and enabling it to be positioned in a housing provided on at least one of the two printed-circuit boards.

Indeed, it is preferable for the position of this security element in the input device to be clearly visible at the time of assembly of the input device so as to prevent any assembling error and any subsequent malfunction. Thus, the housing provided for the security element on one of the two printed-circuit boards has for a notch into which the fin of the security element gets inserted, ensuring that it is accurately positioned and held.

The invention also relates to a data input device comprising at least one security element as described here above, the security element taking position between two printed-circuit boards of the data input device in at least one housing provided on one of the printed-circuit boards, the security element closing contacts via each of these two extremities respectively on the two printed-circuit boards of the data input device when the data input device is in a closed position.

Such a data input device corresponds for example to an electronic payment terminal and has all the characteristics explained here above with respect to the security element.

The invention also relates to a method for the detection of an intrusion in a data input device as described here above, comprising a step for detecting an intrusion when at least one contact between one of the two extremities of the security element and one of the two printed-circuit boards is open.

Such a method for detecting intrusion is implemented in the data input device, for example an electronic payment terminal, and has all the characteristics explained here above, pertaining to the data input device and to the security element.

4. FIGURES

Other features and advantages of the invention shall appear more clearly from the following description of one particular embodiment of the disclosure given by way of a simple illustratory and non-exhaustive example and from the appended drawings of which:

5. DESCRIPTION

The general principle of the technique described consists in securing a data input device in protecting two printed-circuit boards of the device with a single "dummy key", mounted between the two printed-circuit boards and in closing contacts on its two extremities. One such "dummy key" is here below called a "dual-face dummy key" or security element.

Thus, the solution according to the different embodiments of the invention enables the creation of a security zone between two printed-circuit boards of a data input device, for example a PCB ("Printed Circuit Board") (or FPC for "Flexible Printed Circuit") or another PCB (or FPC) each comprising a lattice by means of a security element mounted between the two printed-circuit boards. These printed-circuit boards secure each other in a way because, if the "dual-face dummy key" is removed whether on one side or the other (i.e. on either one or the other of the printed-circuit boards), then an infringement is detected.

For example, one of the two printed-circuit boards can correspond to the motherboard and the other can correspond to a PCB or FPC that is to protect a function (for example a smartcard reader) or create a security zone in which sensitive components can be placed and/or sensitive information can be made to transit.

Here below, a more particular description shall be provided of the embodiments in which the data input device corresponds to an electronic payment terminal but the invention applies to any data input device responding to the same security problems and issues.

Figure 1:
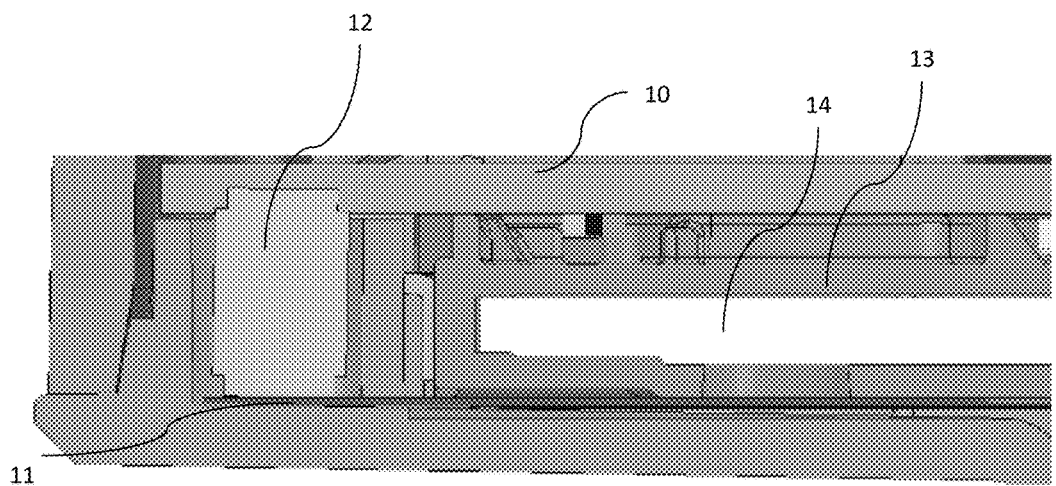
FIG. 1 is a schematic view of a part of the payment terminal according to one embodiment of the invention.

Referring now to FIG. 1, we describe an example of implementation of the invention in an electronic payment terminal having especially a first printed-circuit board 10 corresponding for example to an FPC and a second printed-circuit board 11 corresponding for example to the motherboard. According to this embodiment, the electronic payment terminal also has a smartcard reader 13 with an insertion slot 14 for the card.

Finally, a security element 12 is mounted so as to come into contact via each of its extremities with the two printed-circuit boards 10 and 11 at specific locations, when the electronic payment terminal is in a closed position, for its use (i.e. when the elements are mounted and the two parts of the cover are closed).

According to this embodiment of the invention, the security element 12 is mounted in the rear of the card reader but different locations can be chosen according to the layout of the other elements of the electronic payment terminal for example.

It must also be noted that the two extremities of the security 12 are not connected electrically, so as not to connect the two printed-circuit boards when the security element is positioned. Indeed, the aim of the solution according to the different embodiments of the invention is not to ensure contact between two printed-circuit boards via a security element (for example known security elements such as a Zebra connector designed to secure a zone through detection of a break in contact provided by the Zebra connector itself) but to detect an infringement/intrusion in a data input device through a security element acting on both sides to make contact with two distinct printed-circuit boards.

Thus, contrary to the prior art solutions, even if an attacker glues the "dual-face dummy key" and its support, he will be obliged to handle the unit constituted by the "dual-face dummy key" and its support as well as the two printed-circuit boards. The security enclosure constituted is therefore preserved and if the attacker wishes to access this security zone and its components, he will be forced to try to short-circuit the lattice or the contacts and this necessarily requires far greater amounts of time and will considerably increase the risk of creating an infringement.

In addition, since a single "dual-face dummy key" is used to secure two circuits, the force (due to the compression of the dummy keys) created on the covers of the data input device is half what it would be if two dummy keys were to be used to respectively secure each of the printed-circuit boards. The solution of the invention according to its different embodiments has therefore no impact on the reliability of the secured device or even reinforces this reliability because the risk that one of the dummy keys will malfunction is halved.

Figure 2:
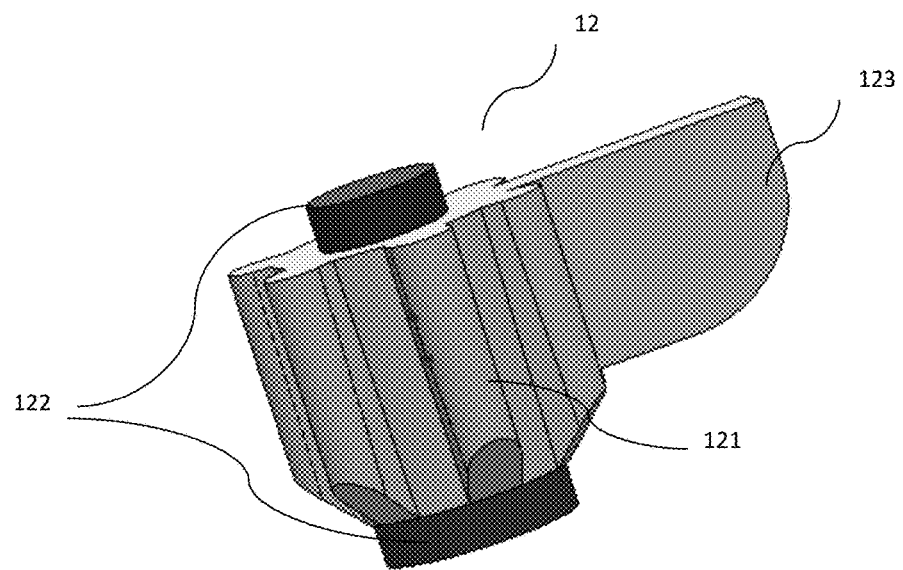
FIG. 2 illustrates an example of a security element according to one embodiment of the invention.

A more detailed description is now provided of the structure of a security element 12 with reference to FIG. 2 according to one embodiment of the invention.

According to this particular embodiment of the invention illustrated in FIG. 2, the security element 12 has a ridged/crenellated cylindrical shape 121 almost throughout its height, making it possible especially to reduce the pressure on the printed-circuit boards.

Indeed, in this embodiment, the housing provided for the "dual-face dummy key" must have a diameter that is great enough to be able to house the FPC therein. A security element corresponding to a single cylinder occupying the entire space in the housing would generate a great volume of matter to be compressed and therefore create major forces on the cover. This specific shape of the cylinder with its ridges therefore reduces the volume of matter to be compressed and therefore reduces the forces on the covers while maintaining efficient guidance in the housing.

In addition, the security element 12 has a protrusion 122 at each of its extremities to ensure respective contact with each of the two printed-circuit boards. According to the variant illustrated in FIG. 2, the two protrusions have different sizes so as to adapt to the configuration of the printed-circuit boards and especially to the space available. These protrusions can however be identical. It is these specific parts of the security element 12, the extremities 122, that exert pressure on each of printed-circuit boards when the data input device is in the closed position, so as to close one or more contacts. Besides, the opening of this contact or these contacts is detected by one or more detection circuits of each of the printed-circuit boards especially when there is an attempted infringement by the removal of the "dual-face dummy key" or the moving away of one of the two circuits from one of the extremities of this "dual-face dummy key".

Finally, according to this embodiment of the invention, the security element 12 also has a sort of lateral fin that enables it to be accurately positioned during the mounting and is designed especially to coincide with a notch in the housing intended for the security element on one or other of the printed-circuit boards. Indeed, because of its symmetrical shape, without this fin, the security element 12 could be poorly positioned in the data input device (i.e. its positioning could be ambiguous) and it could potentially create a malfunction. The presence of the fin removes this drawback by limiting the possibilities of positioning to only one possibility. This is so also because of the shape of the support/housing present on either of the printed-circuit boards.

Figure 3A:
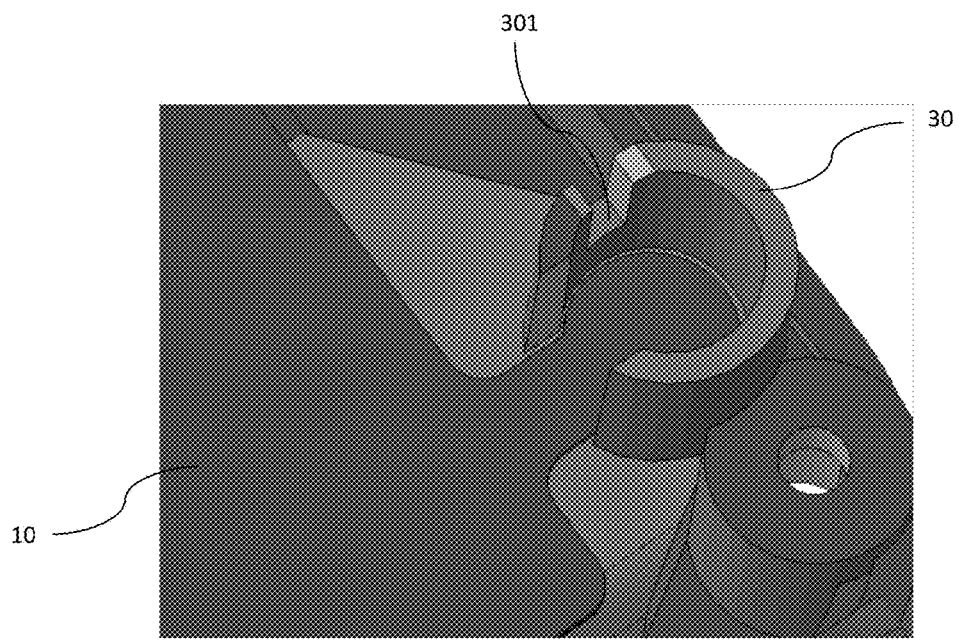
FIGS. 3a and 3b illustrate a part of a printed-circuit board for an electronic payment terminal having a housing for a security element respectively without and with a mounted security element according to one embodiment of the invention.
Figure 3B:
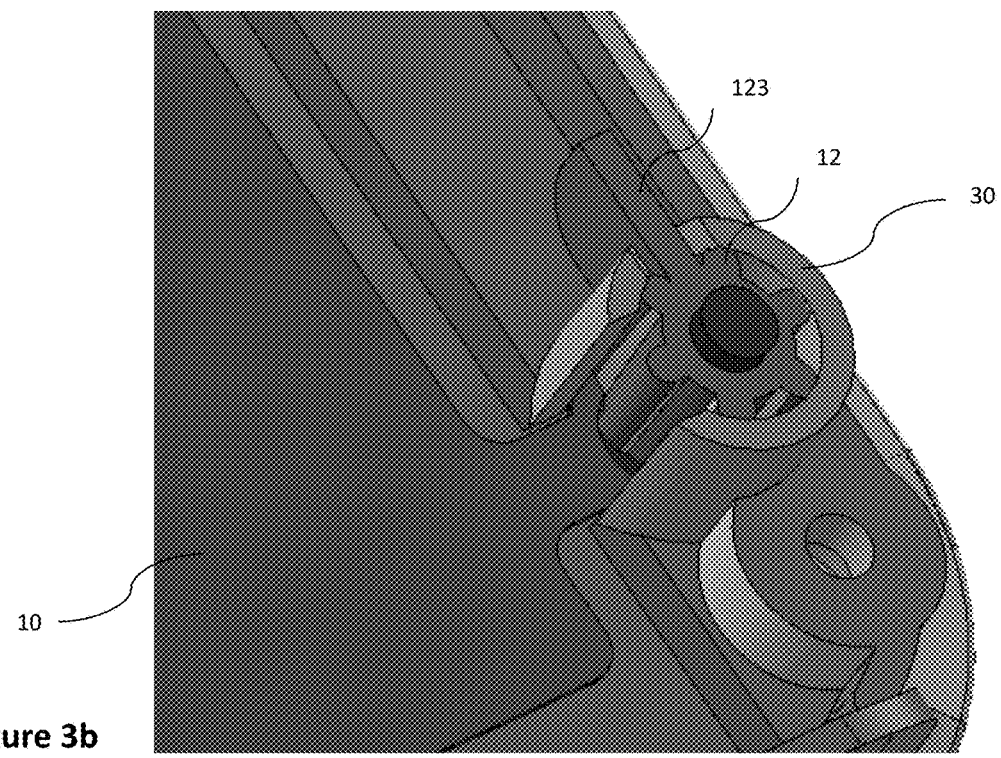

This positioning of the security element 12 is especially illustrated in FIG. 3b which illustrates a part of the printed-circuit board having a housing provided to receive the security element.

FIG. 3a illustrates this same printed-circuit board 10 (for example an FPC or a daughterboard) without the security element 12. This printed-circuit board 10 therefore has a housing 30 that is also cylindrical, intended for receiving the security element 12 and having a notch 301 that is to receive the fin 123 of the security element 12 for the correct and precise positioning of the security element.

Once positioned in the housing 30 (as shown in FIG. 3b), the security element 12 is maintained by the printed-circuit board 10 and can therefore fulfill its function of securing the data input device, when the second printed-circuit board 11 (not shown on the FIG. 3b) is brought into contact, by pressure, with the other end of the security element.

These different elements (security element 12, housing 30 in the printed-circuit board etc.) are associated with one or more intrusion detecting circuits, based on the detection of the opening of the contact. The method for detecting intrusion into such a secured data input device implements a step for detecting intrusion when one or more contacts between at least one of the extremities of the security element 12 and the printed-circuit board, is open. This detection is especially implemented by the intrusion-detecting circuit or circuits, which are known per se and are not described herein.

According to one embodiment of the invention, the two extremities of the security element are for example carbon-charged and therefore conductive contacts whereas the central toothed cylindrical part and the fin are made of silicone and therefore constitute an insulator. All other materials that enable the two extremities of the security element to be made conductive and that provide an insulating character to the central part and its fin can of course be used.

The invention claimed is:

1. A security element for a data input device, the security element being mounted between the first and second printed-circuit boards of said data input device and comprising:
   a shape adapted to closing contacts via each of two extremities respectively on the first and second printed-circuit boards of the data input device when said data input device is in a closed position, said extremities being not electrically connected to each other.

2. The security element according to claim 1, wherein said adapted shape corresponds to a cylinder that is ridged on at least a part of a height of an external surface of the cylinder.

3. The security element according to claim 1, wherein the security element has a cylindrical protrusion at each extremity, said protrusions providing contacts with each of the printed-circuit boards.

4. The security element according to claim 1, further comprising a positioning fin that extends laterally on a part of 4s-a height of the positioning fin to provide for positioning and holding of the security element in at least one housing provided on one of the two printed-circuit boards.

5. A data input device, which comprises:
first and second printed circuit boards;
at least one housing provided on one of said first or second printed-circuit boards; and
at least one security element taking position between the first and second printed-circuit boards of said data input device in the at least one housing, the security element closing contacts via each of two extremities respectively on said first and second printed-circuit boards when said data input device is in a closed position, said extremities being not electrically connected to each other.

6. A method for detecting an intrusion in a data input device, the method comprising:
providing the data input device in a closed position, wherein the data input device comprises:
first and second printed circuit boards;
at least one housing provided on one of said first or second printed-circuit boards; and
at least one security element taking a position between the first and second printed-circuit boards of said data input device in the at least one housing, the security element closing contacts via each of two extremities respectively on said first and second printed-circuit boards when said data input device is in the closed position, said extremities being not electrically connected to each other; and
detecting intrusion when at least one contact between one of the two extremities of said security element and one of said first and second printed-circuit boards is open.

* * * * *